(12) United States Patent
Castro

(10) Patent No.: US 11,916,386 B2
(45) Date of Patent: Feb. 27, 2024

(54) ARRANGEMENT FOR CONTROLLING ELECTRICAL GADGETS

(71) Applicant: Sergio Javier Castro, Ciudad Autónoma de Buenos Aires (AR)

(72) Inventor: Sergio Javier Castro, Ciudad Autónoma de Buenos Aires (AR)

( * ) Notice: Subject to any disclaimer, the term of this patent is extended or adjusted under 35 U.S.C. 154(b) by 507 days.

(21) Appl. No.: 17/260,741

(22) PCT Filed: Oct. 18, 2018

(86) PCT No.: PCT/CL2018/050098
§ 371 (c)(1),
(2) Date: Jan. 15, 2021

(87) PCT Pub. No.: WO2020/077474
PCT Pub. Date: Apr. 23, 2020

(65) Prior Publication Data
US 2021/0242681 A1  Aug. 5, 2021

(51) Int. Cl.
*H04B 10/00* (2013.01)
*H02J 3/14* (2006.01)
*H02J 13/00* (2006.01)
*G08C 23/00* (2006.01)

(52) U.S. Cl.
CPC ............... *H02J 3/14* (2013.01); *G08C 23/00* (2013.01); *H02J 13/0005* (2020.01); *H02J 13/00006* (2020.01); *H02J 2310/12* (2020.01)

(58) Field of Classification Search
CPC . H04B 10/116; H04B 10/112; H04B 10/1123; H04B 10/114; H04B 10/1143; H04B 10/1149; H04B 10/40; G08C 23/00; G08C 23/04; H05B 33/0842; H02J 3/14; H02J 13/0005
USPC ....... 398/106, 107, 118, 119, 127, 128, 129, 398/130, 131, 135, 136, 158, 159, 172, 398/164, 182, 183, 202, 208, 209; 340/825.69, 825.72, 825.22

See application file for complete search history.

(56) References Cited

U.S. PATENT DOCUMENTS

| 7,994,654 | B2 | 8/2011 | Lee | |
|---|---|---|---|---|
| 8,427,006 | B2 | 4/2013 | Gilbert | |
| 8,433,197 | B2 * | 4/2013 | O'Callaghan | H04N 21/414 398/106 |
| 2010/0295371 | A1 | 11/2010 | Lee | |
| 2013/0300314 | A1 * | 11/2013 | Weda | H04B 10/116 398/106 |

FOREIGN PATENT DOCUMENTS

EP          1819027 A2     8/2007

* cited by examiner

*Primary Examiner* — Hanh Phan
(74) *Attorney, Agent, or Firm* — Mariana I. Vernieri

(57) ABSTRACT

The invention relates to an arrangement for controlling electrical gadgets, which comprises at least one master device and a slave switch device; or at least one master device and a slave socket device; or at least two master devices, as long as at least one of them is a switch-type device; or any of the master and switch devices and an external control. The arrangement for controlling electrical gadgets provides safety to the user and a substantial energy saving while generating comfort for the user.

4 Claims, 2 Drawing Sheets ial stage application, filed under 35 U.S.C. § 371, of International Patent Application No. PCT/CL2018/050098, filed on Oct. 18, 2018, which is incorporated by reference herein in its entirety.

TECHNICAL FIELD

The present invention relates to a set of devices for the control of electrical appliances, of the type used in homes or offices. The invention is preferably related to saving energy in an intelligent way and the generation of comfort for the user.

BACKGROUND OF THE INVENTION

As is generally known, many of the electrical and electronic devices that are used at home consume a certain amount of energy even if they are in state of rest or inactive. Much of this consumption is known as phantom or Stand By consumption, which represents a considerable percentage of the annual electricity consumption of a home. This is due to the fact that the energy sources of most current electrical appliances consume energy even if the appliance is turned off if they are connected to the mains, because they remain in alert (Stand By) state before the user's intention to turn them on. Regular transformers also have a marginal consumption when they are not used if they are connected to the mains.

In addition, another significant and unnecessary consumption factor is usually the luminaires that are left on during the night, and that the user turns them off only when he wakes up in the morning and not when the sunlight is already enough to naturally illuminate the environment. It also happens that many individuals, due to the remoteness of some switches from the place of the building where they are, leave the lights on until the moment it is convenient for them to turn them off. Another very common behavior should be noted, which is leaving lights, televisions, audio equipment, etc. lit in children's bedrooms so that they fall asleep but then remain on throughout the night due to the discomfort of getting out of bed, after children fall asleep, to turn them off. There are also devices such as digital frames or decoration lights that are usually on 24 hours a day, although no one is in the room due to the difficulty and discomfort of connecting and disconnecting them from the electrical network only when someone can observe them. A very common problem with electrical outlets is the danger that their location implies when there are small children at home. Mechanical elements are often used to prevent someone from inserting an element through their slots and thus making contact with the electrical current. These elements generally do not interrupt the electrical current between the contacts, but rather prevent anything other than a plug from being inserted into the slots. When these mechanical elements fail or break due to stress of materials or improper operation, protection disappears.

SUMMARY OF THE INVENTION

The object of the present invention is to provide a set of devices for the control of electrical appliances that allows to reduce the unnecessary consumption of the devices in stand-by mode. It is also an object of the present invention to provide a set of devices for the control of electrical appliances that allows turning off or on either electrical appliances or lighting fixtures that are far from the user's reach even in other environments. And that also allows to turn on or turn off all electrical appliances and lighting fixtures in a building from a single device, but which in turn makes it possible to independently govern each one of them. It is also an object of the present invention to provide a set of devices for the control of electrical appliances that provides safety for the user and causes substantial energy savings, while generating comfort for the user. It is therefore an object of the present invention to provide a set of devices for the control of electrical appliances, wherein the device comprises at least one master device and one slave switch device, or at least one master device and one slave socket device, or at least one least two master devices as long as at least one is of the switch type. Or any of the devices being either masters or switches and an external control.

BRIEF DESCRIPTION OF THE DRAWINGS

For the sake of clarity and understanding of the object of the present invention, it has been illustrated in several figures, in which it has been represented in one of the preferred embodiments, all by way of example, where.

DETAILED DESCRIPTION AND BEST MODE OF IMPLEMENTATION

The purpose pursued by the invention is achieved thanks to the development of devices that can interrupt the electrical current of the connected devices when users activate their sensors, and that also have an intercommunication mechanism that allows them to respond to an interruption order from another of these devices. They have a hierarchical interconnection structure where the master type devices can both generate an on or off signal and replicate a signal from another master. Slave type devices only receive on or off signals and interrupt the electrical current or allow the passage of electrical current to the connected appliance depending on the signal received.

Figure 1:
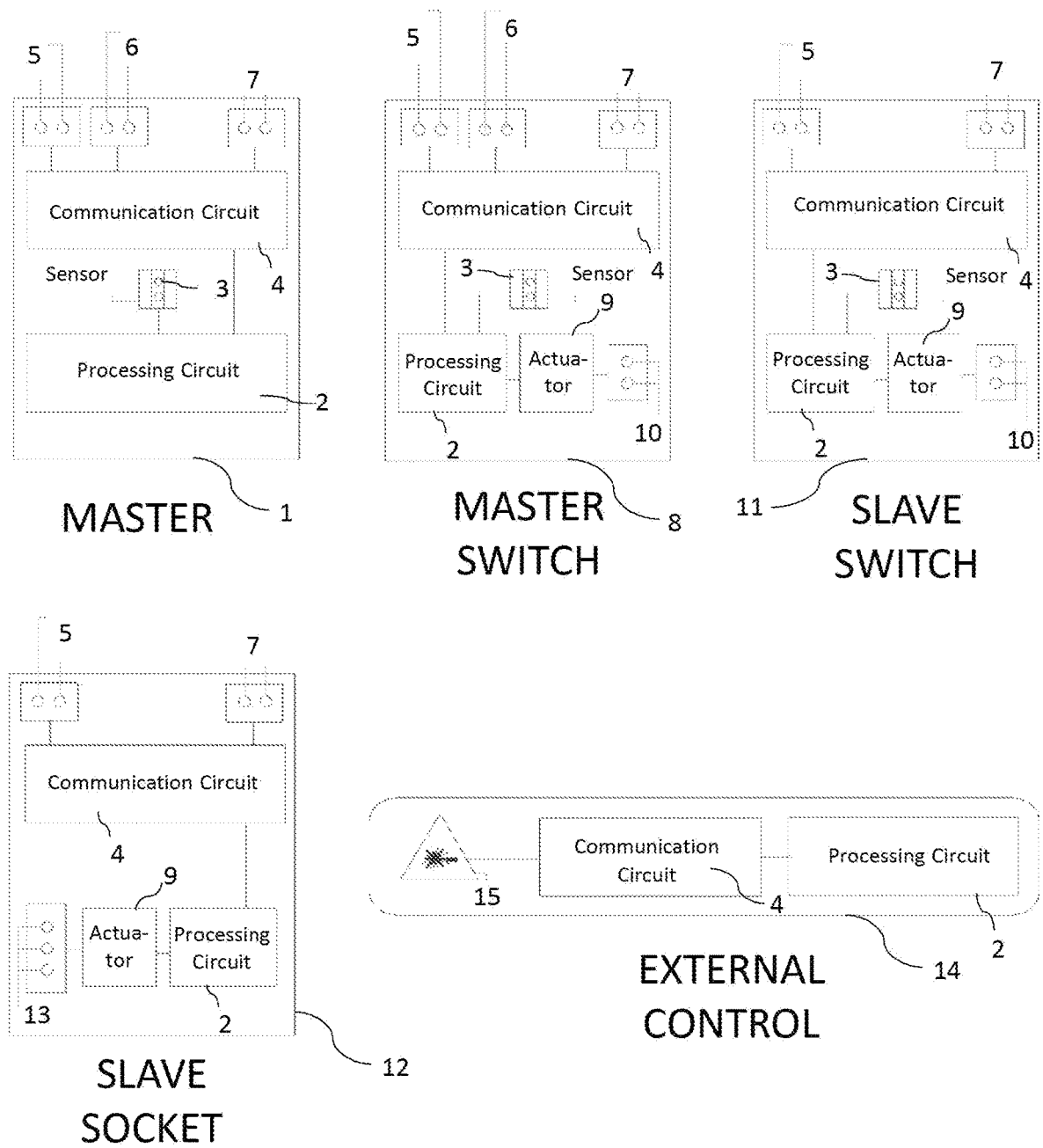
FIG. 1 is a diagram of the set of devices object of the present invention.

As shown in FIG. 1, a Master device 1 has a Processing Circuit 2, an Optical sensor 3, and a Communication Circuit 4, as well as input ports 5, output ports 6 and a power supply 7. Master-type devices 1 send signals when their sensor 3 is triggered or when a signal arrives at their input port 5. A Master Switch 8 has a Processing Circuit 2, an Actuator Circuit 9, an Optical Sensor 3, and a Communication Circuit 4, as well as input ports 5, output ports 6 and a power supply 7 and is connected to the Gadget to be controlled 10. Slave-type devices, such as a Slave switch 11, which has a Processing Circuit 2, an Optical sensor 3, and a Communication Circuit 4, as well as input ports 5, and a power supply 7 and is connected to the Gadget to be controlled 10, and a Slave Socket 12 which has an Actuator Circuit 9, a Processing circuit 2, a Communication Circuit 4, as well as input ports 5, and a power supply 7 and is connected to a socket 13, respond both to the activation of their sensor 3 and also to the signal they receive at their input port 5.

The devices have optical type sensors 3 that allow them to detect when an object approaches it and interpret it as the users intention to activate or deactivate the device. These optical sensors 3 also make it possible to calculate the light level of the environment in which they are installed in order to interrupt the electrical current of the connected appliance when the level exceeds the value established during installation. These optical sensors 3 can also recognize light signals from external devices, allowing remote control of all masters 1, 8 and slaves 11. The external control devices 14 have the ability to emit a coded signal, which allows controlling all the installed masters 1, 8 and slaves 11, 12 with a single control device 14 and with no quantity limit. Thanks to all the aforementioned characteristics, users will be able to interrupt the electrical current in all or several of the electrical and electronic devices, whether they are in the same environment or in other environments of the place, with the single action of activating the sensor 3 of a master 1, 8 or slave 11, sending a coded light signal through an external control 14 or when sunlight exceeds a certain threshold. All with the aim of avoiding that the connected appliances 10, 13 generate unnecessary energy consumption or that the electrical outlets represent a potential danger in the presence of children. Combined switch circuits can also be built without the restriction of a maximum number of devices. This means that the same device can be controlled by two or more switches simultaneously. This allows switches to be placed as close to users as possible to increase accessibility.

According to FIG. 1, the set of devices comprises a master device 1, a master switch device 8, a slave switch device 11, a slave socket device 12 and an external control device 14. In this particular embodiment, the devices of the master type 1 have at least one signal input port 5 that serves to receive orders from other masters 1, 8, at least one signal output port 6 that serves to send orders to other masters 1, 8 or slaves 11, 12, a communications circuit 4 that serves to manage the signals, an optical sensor 3 designed to detect nearby objects, receive light signals from an external control and measure the ambient light level and a processing circuit 2 to control the operation of the device. On the other hand, the slave switch device 11 has at least one signal input port 5 that serves to receive commands from the masters 1, 8, a communications circuit 4 that serves to manage the signals, an optical sensor 3 that serves to detect nearby objects, receive light signals coming from an external control 14 and sensing the ambient light level, a processing circuit 2 to control the operation of the device and an actuator circuit 9 to supply or interrupt the electrical current of the appliance 10 to which it is connected. In turn, the set also comprises a slave socket device 12 which comprises in this particular embodiment, at least one signal input port 5 that serves to receive orders from the masters 1, 8, a communications circuit 4 that serves to manage the signals, a processing circuit 2 to control the operation of the device and an actuator circuit 9 to supply or interrupt the electrical current of the appliance 13 to which it is connected. It should be mentioned that the device of external control type 14 comprises a communications circuit 4 used to manage the signals, a processing circuit 2 to control the operation of the device, and a light signal emitter 15.

Figure 2:
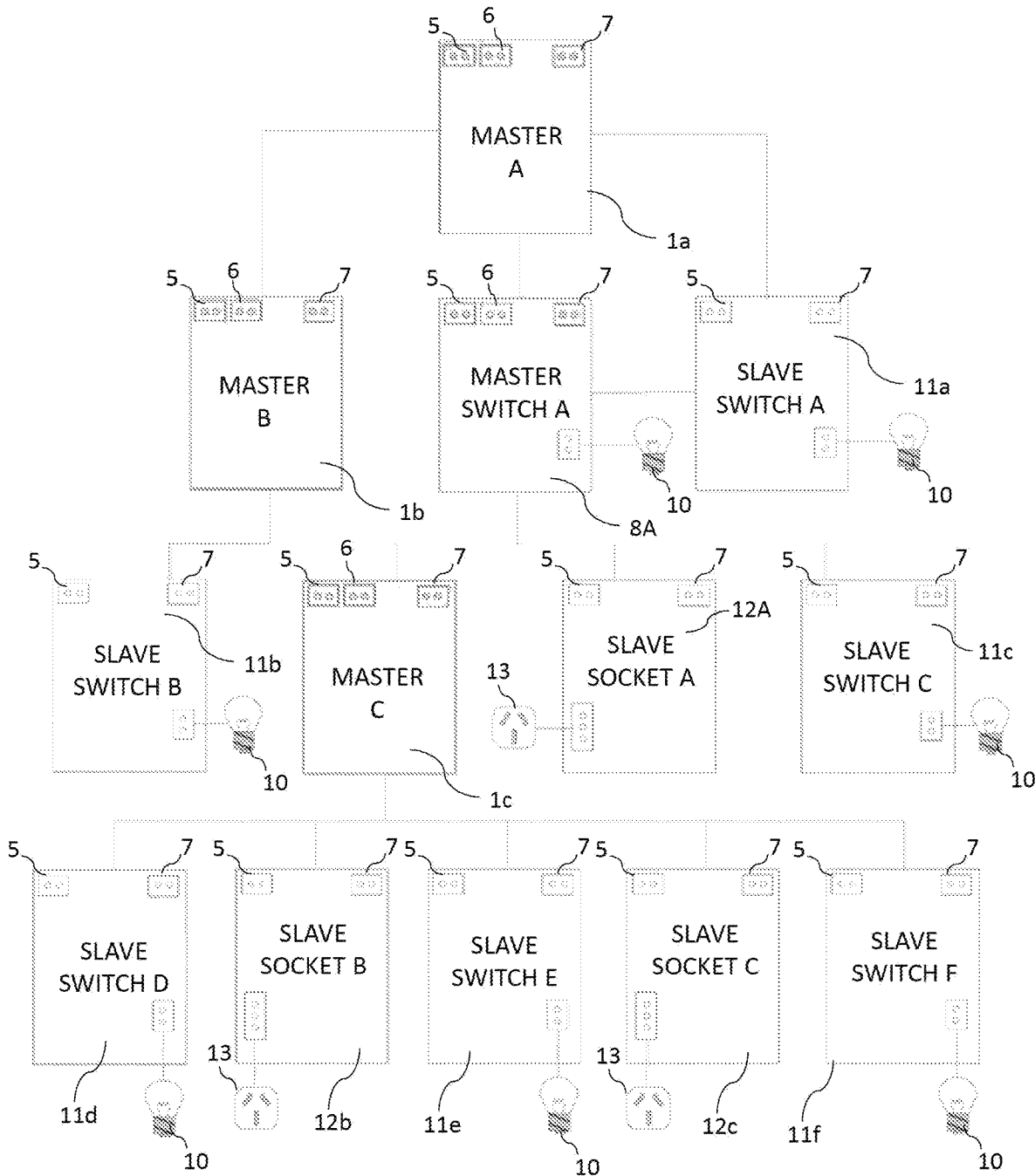
FIG. 2 is an application scheme of the set of devices of FIG. 1.

FIG. 2 shows a hierarchical structure of an embodiment of a set of devices in accordance with the present invention, including three Master Devices, 1a to 1c, each with their input port 5, output port 6 and power supply 7, one Master switch device 8a having an input port 5, output port 6, power supply 7, and being connected to a gadget to be controlled 10, six slave switches 11a to 11f, each having an input port 5, power supply 7, and being connected to a gadget to be controlled 10, and three slave sockets 12a to 12c, each having an input port 5, power supply 7, and being connected to a socket 13.

Next, a detailed description of the operation of the set of devices object of the present invention follows. Indeed, the master devices 1, 8 remain in standby mode until they receive an electrical signal through one of their signal input ports 5, until a signal is detected through their optical sensor 3 or until the ambient light volume exceeds a set value. When any of these happens, the master 1, 8 sends an electrical signal through its output port 6 to all devices, both masters 1, 8 and slaves 11, 12, that are connected to it. Master devices 1, 8 can both receive and forward signals and only send signals to other devices that are connected to it. The slave switch devices 11 remain in standby mode until they receive an electrical signal through one of their signal input ports 5, until a signal is detected through its optical sensor 3 or until the ambient light volume exceeds a set value. When a signal is received through its input ports 5, the slave switch 11 first checks the status of the current switch and then evaluates whether, based on the received signal, it should modify the status of the switch or should remain unchanged. In the event that the order received is contrary to the state of the switch, the slave switch modifies its state. When the slave switch devices detect a signal through their optical sensor 3 they automatically change the current switch state to the opposite state. This means that if the switch was activated at the moment of detecting the signal, it must be deactivated and vice versa. When the ambient light volume exceeds a certain value while the slave switch is activated, it will be automatically deactivated. Slave switch devices 11 only receive signals and do so through their input ports 5 and optical sensor 3. Slave socket devices 12 remain in standby mode until an electrical signal is received through one of their signal input ports 5. When a signal is received through its input ports 5, the slave socket first checks the status of the current switch and then evaluates whether, based on the received signal, it should modify the status of the switch or should remain unchanged. In the event that the order received is contrary to the state of the switch, the slave socket will modify its state. Slave socket devices 12 only receive signals through their input ports 5. External control devices 14 emit light signals through their signal emitter so that both a master device 1, 8 and a slave switch device 11 can receive them through their optical sensor 3 and in this way react according to their functionality.

The description as set forth is not intended to be exhaustive or to limit the invention to the precise form disclosed. Many modifications and variations are possible in light of the teachings above without departing from the spirit and scope of the forthcoming claims.

The invention claimed is:

1. A set of devices for controlling electrical appliances, the set of devices comprising at least one master device and at least a second device, wherein said master device comprises a Processing Circuit, an Optical sensor, a Communication Circuit, at least one input port, at least one output port, and a power supply, and said second device comprises a Processing Circuit, a Communication Circuit, at least one input port, and a power supply, wherein said input port serves to receive orders from other masters, said output port serves to send orders to other masters or slaves, said communications circuit is used to manage signals, said optical sensor is designed to detect nearby objects, receive light signals from an external control and measure ambient light level and said processing circuit controls said master device.

2. A set of devices for controlling electrical appliances, the set of devices comprising at least one master device and at least a second device, wherein said master device comprises a Processing Circuit, an Optical sensor, a Communication Circuit, at least one input port, at least one output port, and a power supply, and said second device comprises a Processing Circuit, a Communication Circuit, at least one input port, and a power supply, wherein said second device is a master switch comprising at least one signal input port that serves to receive orders from other masters, at least one signal output port that serves to send orders to other masters or slaves, a communications circuit that serves to manage signals, an optical sensor designed to detect nearby objects, receive light signals from an external control and measure ambient light level, a processing circuit to control said master switch and an actuator circuit to supply or interrupt an electrical current of an appliance to which said master switch is connected.

3. A set of devices for controlling electrical appliances, the set of devices comprising at least one master device and at least a second device, wherein said master device comprises a Processing Circuit, an Optical sensor, a Communication Circuit, at least one input port, at least one output port, and a power supply, and said second device comprises a Processing Circuit, a Communication Circuit, at least one input port, and a power supply, wherein said second device is a slave switch comprising at least one signal input port that serves to receive commands from the masters, a communications circuit that serves to manage signals, an optical sensor that is used to detect nearby objects, receive light signals from an external control and measure environmental light levels, a processing circuit to control said slave switch and an actuator circuit to supply or interrupt an electrical current of a device to which said slave switch is connected.

4. A set of devices for controlling electrical appliances, the set of devices comprising at least one master device and at least a second device, wherein said master device comprises a Processing Circuit, an Optical sensor, a Communication Circuit, at least one input port, at least one output port, and a power supply, and said second device comprises a Processing Circuit, a Communication Circuit, at least one input port, and a power supply, wherein said second device is a slave socket comprising at least one signal input port that serves to receive commands from the masters, a communications circuit that serves to manage signals, a processing circuit to control said slave socket, and an actuator circuit to supply or interrupt an electrical current of an appliance to which said slave socket is connected.

* * * * *